Oct. 4, 1932.    G. H. CURTISS    1,880,842
AUTOMOTIVE VEHICLE
Original Filed Aug. 8, 1925    2 Sheets-Sheet 2
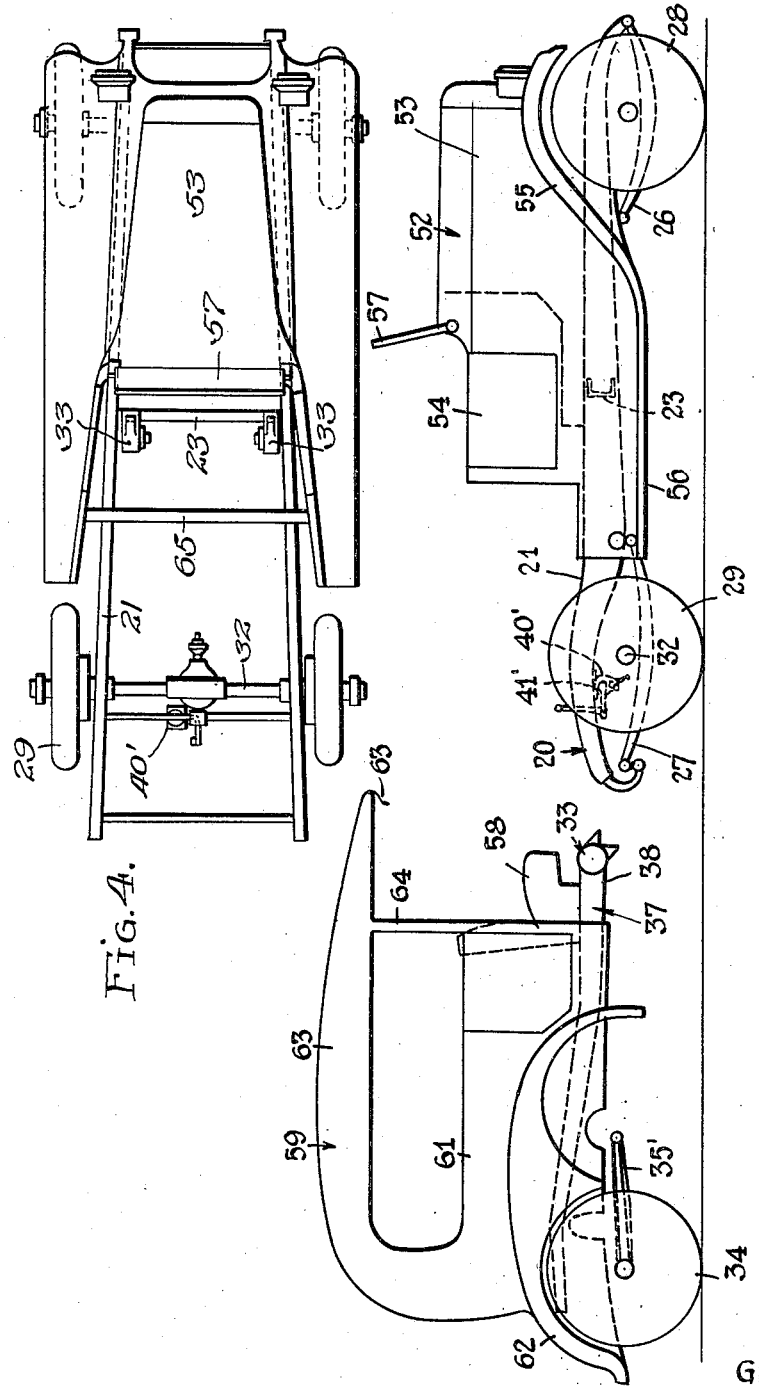
INVENTOR
GLENN H. CURTISS.
BY
ATTORNEY Patented Oct. 4, 1932

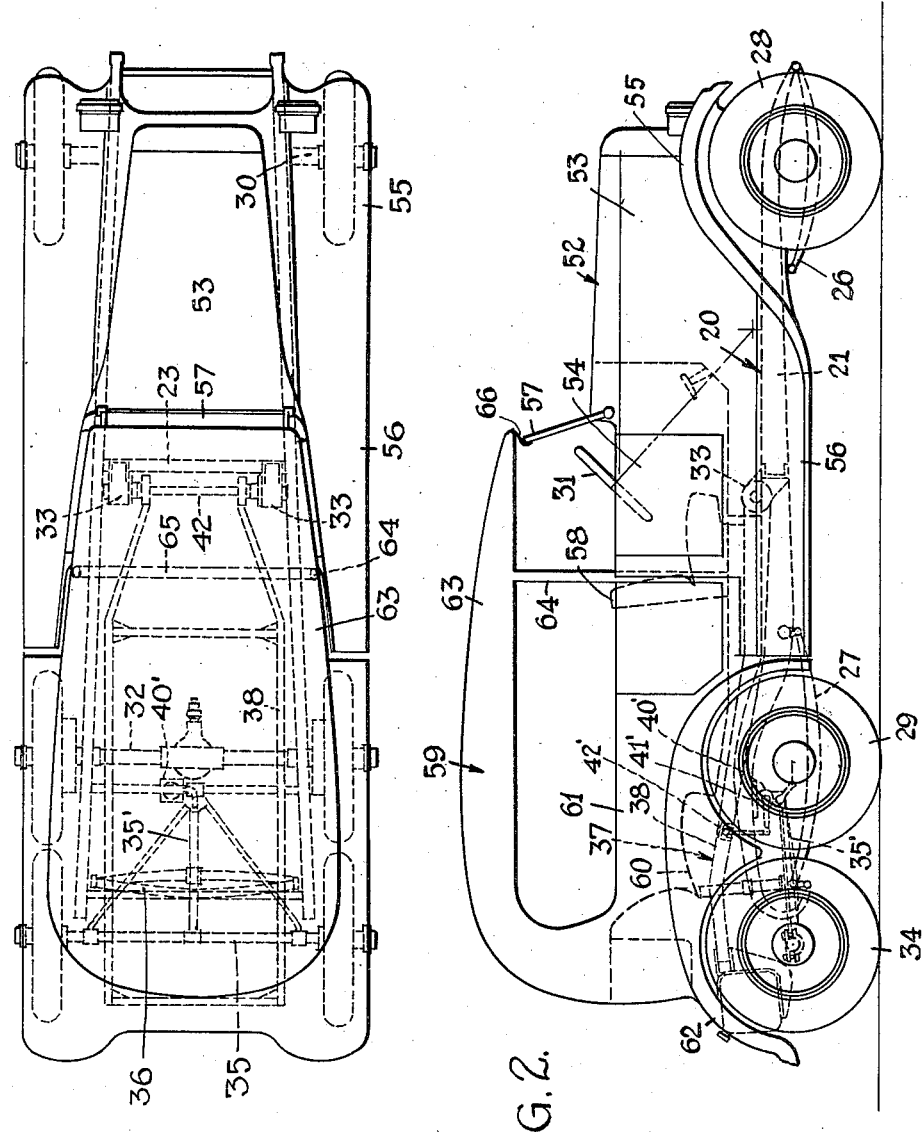

1,880,842

UNITED STATES PATENT OFFICE

GLENN H. CURTISS, OF HIALEAH, FLORIDA, ASSIGNOR TO THE AEROCAR CORPORATION, OF WILMINGTON, DELAWARE, A CORPORATION OF DELAWARE

AUTOMOTIVE VEHICLE

Original application filed August 8, 1925, Serial No. 48,922. Divided and this application filed September 7, 1926. Serial No. 133,944.

My invention relates to road vehicles and has reference more particularly to such automotive vehicles as automobiles.

An automobile, under existing practices, may be said to include as indispensable parts, a body structure, and a supporting and propelling chassis. Usually the chassis comprises, in addition to the power plant and its accessories, an essentially rigid chassis frame, suitable power transmission mechanism, front and rear wheels, and appropriate springs upon which the chassis frame is supported. The body, regardless of type, is generally built as a unit structure, is rigidly fastened to and upon the chassis frame, and for the effective absorption of such road shocks as reach the axles is dependent upon the front and rear springs, of which there are usually four, two front and two rear.

Under ordinary good road operating conditions, an automobile body, suspended or supported in the manner indicated, gives excellent riding comfort. Under contrary conditions, however, the conventional spring and body arrangement is less satisfactory. When rough and undulating road beds are required to be traveled, the occupant or occupants of the vehicle, and especially the occupant or occupants of the rear seat or seats, instead of riding in comfort, are jolted and jostled about in a most objectionable manner; in fact, so much so that riding becomes irksome, tiresome and uncomfortable in the extreme.

An object of the present invention is to improve very materially the riding qualities of the automobile, and especially is it intended that the comfort and pleasure of riding, when occupying the rear seat or seats, shall be greatly improved. The body of the vehicle (and the invention is especially concerned with the passenger type automobile), unlike existing bodies, is transversely divided. Accordingly, in lieu of a longitudinal continuous or unit body structure, a forward body portion and a rear body portion are provided. The forward body portion is directly mounted upon a chassis frame, in all essential respects, exactly similar to the conventional type chassis frame now generally employed. The rear body portion, within which both the front and rear seat or seats are contained, is, however, differently supported. A secondary chassis frame, in the nature of a chassis frame extension, pivoted to the primary or conventional type chassis frame, constitutes its suppport. Said secondary chassis frame, at its forward end, is fastened to and supported by the primary chassis and at its opposite end, it extends or projects rearwardly well beyond the corresponding end therof; such extended end being independently tho yieldingly supported. Intermediately of its ends, the secondary chassis, is yieldingly fastened to the primary chassis by means of an appropriate shock absorber so organized and arranged as to yieldingly resist all relative movement between the two frames. Thus supported, the rear body portion is adapted to yield independently of the forward body portion and the occupant or occupants of the seat or seats therein contained may, even under adverse road conditions ride with exceptional comfort and ease. For a better understanding of the chassis frame construction and the spring suspension thereof, attention is directed to application Serial #48922, filed August 8, 1925, of which the present application is a division and on which, Patent No. 1,682,324 was issued.

A further object of the invention is the provision of a divided body structure in which the respective body portions are not only relatively movable but one in which the exterior body lines of such divided body structure are so formed and related as to longitudinally merge and present, in appearance, at least, a longitudinally continuous or unit body structure.

Other objects, advantages, and improved results will be hereinafter set forth.

In the drawings, wherein like reference characters denote like or corresponding parts, Fig. 1 is a plan view of the complete machine;

Fig. 2 is a side elevation,

Fig. 3 is a more or less diagrammatic view (in side elevation) of the complete machine showing the forward and rear sections thereof wholly detached, and Fig. 4 is a view similar to Fig. 1 with the rear body structure removed.

In the embodiment of the invention selected for illustration I have provided what I shall hereinafter designate a primary chassis and a secondary chassis. The primary chassis is of more or less conventional design. It comprises a chassis frame 20 having its longitudinal or side frame members 21 intermediately cross-braced as at 23. Said frame 20, at its forward end, is yieldingly supported by front springs 26 and at its rear end it is similarly supported by rear springs 27. These springs, four in number, two front and two rear, provide a four-point suspension for the primary chassis frame. The running gear for the primary chassis frame includes front or steering wheels 28 and rear or driving wheels 29. The front wheels 28 are mounted on a front axle 30 and are appropriately connected with the steering mechanism, only the steering wheel 31 of which is shown. The rear wheels 29 are mounted on the rear axle 32 and are adapted to be driven thru appropriate power transmission mechanism by the motor or power plant (not shown).

The secondary chassis, unlike the primary chassis, is provided with but a single pair of road or supporting wheels. These wheels designated as 34, together with an axle 35 and a transverse fully elliptic spring 36, yieldingly support the rear end of the secondary chassis frame. Said frame, at its forward end, is directly supported upon the primary chassis and like the frame 20, it is substantially rigid throughout and comprises side frame members 38 appropriately cross-braced. It also includes as a structural element, a cross-rod 42 which is preferably disposed at its extreme forward end where it is fastened or embedded, at its opposite ends, within suitable anchorages 33 bolted or otherwise fastened to the cross-frame member 23 of the primary chassis frame. Thus fastened, said rod 42 defines a pivot axis about which the secondary chassis frame is adapted to rotate or swing. Preferably said frame 37 is narrower than the frame 20 to fit between its sides.

Throughout the greater portion of its length the secondary chassis frame 37 overlaps the primary chassis frame 20. Its two-point connection with the primary chassis is approximately midway the ends of the primary chassis frame. From said point of attachment or connection said secondary chassis frame extends rearwardly to a point well beyond the rear end of the primary chassis frame. It is beneath such extended or projecting portion of the frame 37 that the spring 36 is mounted. Said spring 36, in the preferred form of the invention, is fastened forwardly of the rear axle 35. It is fastened at the top to the rear cross-frame member of the secondary chassis and at the bottom it is fastened to a fore and aft rod 35' extending between said rear axle 35 and one of the cross-frame members of the primary chassis frame. Thus positioned, the portion of the load that would otherwise be carried by the axle 35 and wheels 34 is borne by the rear or driving wheels 29 of the primary chassis. Such an arrangement is also conducive to the proper suspension of the secondary frame in that road shocks and jolts which would otherwise be carried to said frame, are to a large extent completely washed out by the spring 27 before reaching the frame 37.

The secondary chassis frame, as intimated, is movable in all directions relatively to the primary chassis. Such movement is both yielding and restricted. The anchorages 33, spaced as they are, provide at the forward end of the secondary chassis, two points of yielding support. The spring 36 provides at the rear end of said frame but a single point of yielding support. Collectively, a three-point support, yielding at all of its several points, is provided. Such a support, in effect triangular, is, for obvious reasons, desirable. In laterally spacing the two forward points of support, and in so constructing the anchorages 33 as to admit of slight yielding movement of the frame 37 in all directions or motion, all vibrational inertia and other minor shocks, which would otherwise be directly carried to said frame, are effectively absorbed and dissipated at said anchorages, and the frame 37 is at the same time yieldingly held, under all operating conditions, substantially parallel to the road bed. Shocks tending to vertically displace the rear end of the frame 37 are effectively absorbed by the spring 36. Shocks tending to displace the forward end of the frame 37 are absorbed for the major part by the front and rear springs of the primary chassis upon which the forward end of said frame is directly tho yieldingly supported and at the same time, to a lesser, tho important degree, by the yielding anchorages 33. In other words, not only are the springs 26 and 27 upon which the primary chassis frame is directly mounted at all times effective, but in addition thereto, the spring 36 and the anchorages 33 (the latter in conjunction with said springs 36 and 37) contribute very materially to the effective absorption and dissipation of all ordinary and most of the extraordinary road shocks, even tho rough or undulating road beds are at the time being traversed.

To dampen and at the same time yieldingly resist all relative movement of the secondary chassis frame, there is provided, at a point intermediately of its ends, a shock absorber 40'. Preferably the shock absorber 40' is of the well known hydraulic type. It is fastened to the primary chassis frame as at 41' and to the secondary chassis frame as at 42'. The points of attachment being, in each instance, disposed substantially equidistant from the sides of the respective frames. In actual practice it has been found that the use of a shock absorber or a snubber at the point mentioned, tends to lessen the vibrations of the secondary chassis frame and thru its damping effect, add greatly to the ease and comfort of riding.

In describing the body structure, as distinguished from its supporting chassis, attention is directed to the fact that while a passenger type body structure is shown, a different type body structure, if desired, may be equally as well employed. The passenger type body structure illustrated, instead of being a unit or longitudinally continuous body structure, is transversely divided intermediately of its ends. Two separate body structures, a forward body structure and a rear body structure, are thus provided. The forward body structure, designated in its entirety as 52, is directly mounted upon the primary chassis frame 20, and includes, among other parts, a motor hood and cowl 53, side doors 54, front fenders 55, side running boards 56, and an appropriate windshield 57. The rear body structure, designated in its entirety as 59, tho its exterior body lines merge longitudinally into the exterior body lines of the forward body structure, is constructed nevertheless as a separate body unit (see Fig. 3). It, said rear body structure, includes in addition to the front seat or seats 58 and the rear seat or seats 60, side extensions 61, rear fenders 62, a body top 63 extending forwardly over the steering wheel 31, and uprights 64, the latter, as illustrated in Fig. 2, being extended between the side extensions 61 and the body top. If desired, the uprights 64 may be joined beneath the rear body structure as indicated at 65. By means of a flexible strip 66, fastened to the windshield 57 and to the body top 63, said two body structures are sealed against the weather at this point and may be similarly sealed at other points. The rear body structure is directly mounted upon the secondary chassis frame 37. Moreover, the fenders 62 carried by and movable with said rear body structure, have a length sufficient to span and shield the longitudinally aligned rear wheels 29 and 34 at opposite sides of the machine.

A body structure characterized as above set forth, tho in appearance conventional, comprises relatively movable parts. Its rear end portion is mounted directly upon and is movable with the secondary chassis frame. Its front end portion is mounted directly upon and is movable with the primary chassis frame. Occupants of the front seat or seats are accorded a slightly greater degree of comfort than is ordinarily obtained where a conventional type chassis is employed. Occupants of the rear seat or seats are accorded an even greater degree of riding comfort. Not only is the rear body portion yieldingly supported in part by the springs of the primary chassis, but it is in addition supported by the spring 36 and the yielding connections or anchorages 33. Thus supported, plus the advantage gained by the use of the hydraulic shock absorber, an exceptionally easy riding and comfortable vehicle is produced.

It should be noted in conclusion that the connection between the primary chassis and the secondary chassis frame, though yielding and pivoted, is nevertheless absolutely noiseless. In using rubber or its equivalent wherever possible, squeaks and rattles are avoided and a molecularly yielding rather than a mechanically yielding point or connection is obtained. Such a connection is further desirable in that no lubricant, in the absence of frictionally engaging parts, is under any circumstances required.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. The combination, in a road vehicle, of a four-wheel primary chassis having mounted thereon a forward body portion comprising an engine hood and a windshield; a rear body portion yieldingly supported at its forward end upon said primary chassis at a point well forward of the rear wheels thereof and including a seat and a body top which at its forward end is carried to a point in the vicinity of said wind shield, said rear body portion and said forward body portion being relatively movable, and said rear body portion being extended at its rear end well beyond the corresponding end of said primary chassis; yielding means for connecting said top to said wind shield and for aiding in giving a unitary appearance to such structure; and yieldingly suspended non-driving wheels mounted beneath that part of the overhanging rear end body portion trailing said primary chassis.

2. In a road vehicle, a primary chassis, wheels for said primary chassis, a secondary chassis, wheels for said secondary chassis, a body structure mounted upon said primary and said secondary chassis, and means for maintaining the rear wheels of said secondary chassis substantially parallel with the rear wheels of said primary chassis, said means comprising a pair of anchorages fastened to said primary chassis and a substantially horizontal axle about which said secondary chassis is pivoted and means for fastening said axle to said anchorages.

3. In a road vehicle; a primary chassis; wheels for said primary chassis; a secondary chassis; wheels for said secondary chassis; an axle for said secondary chassis wheels; a body structure mounted upon said primary and said secondary chassis; and means for maintaining the rear wheels of said secondary chassis substantially parallel with the rear wheels of said primary chassis, said means comprising a connection including a substantially horizontal axle about which said secondary chassis is pivoted, anchorages for said axle secured to said primary chassis, a longitudinal bar secured to said primary chassis and to the axle of the wheels of said secondary chassis and a spring mounted on said bar and secured to said secondary chassis.

4. In a road vehicle, a primary chassis, a forward body portion mounted on said chassis, a secondary chassis, an axle and wheels for said secondary chassis, and a rear body portion mounted on said secondary chassis, said secondary chassis including a chassis frame, a frame member connected to said primary chassis and to said secondary chassis axle, and a resilient support for said secondary chassis frame mounted upon said frame member.

5. In a road vehicle; a primary chassis; a forward body portion mounted on said primary chassis; a pair of front wheels for said primary chassis; a pair of rear wheels for said primary chassis; a secondary chassis; a rear body portion mounted on said secondary chassis; a pair of rear wheels for said secondary chassis; a forward seat included in said secondary chassis and mounted intermediate the axis of rotation of the pair of front wheels of the primary chassis and the axis of rotation of the pair of rear wheels of the primary chassis; and a rear seat also included in the said secondary chassis and mounted intermediate the axis of rotation of the rear wheels of said primary chassis and the rear wheels of said secondary chassis, said forward seat and said rearward seat constituting the only seats of said vehicle, whereby an automobile of conventional appearance but of exceptionally easy riding characteristics is obtained.

6. In a road vehicle; a primary chassis having mounted thereon a forward body portion comprising an engine hood and a wind shield; a secondary chassis; a rear body portion mounted upon said secondary chassis and having a body top which at its forward end is carried to a point in the vicinity of said wind shield, said rear body portion and said forward body portion being relatively movable; and a flexible strip connected to said body top and to said wind shield to form a continuous body of unitary appearance.

In testimony whereof I hereunto affix my signature.

GLENN H. CURTISS.